United States Patent
Aoki

(10) Patent No.: US 12,526,375 B2
(45) Date of Patent: Jan. 13, 2026

(54) INFORMATION PROCESSING APPARATUS, NON-TRANSITORY COMPUTER READABLE MEDIUM STORING INFORMATION PROCESSING PROGRAM, AND INFORMATION PROCESSING SYSTEM

(71) Applicant: FUJIFILM Business Innovation Corp., Tokyo (JP)

(72) Inventor: Takashi Aoki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 658 days.

(21) Appl. No.: 17/720,302

(22) Filed: Apr. 14, 2022

(65) Prior Publication Data
US 2023/0164280 A1 May 25, 2023

(30) Foreign Application Priority Data
Nov. 19, 2021 (JP) ................. 2021-188408

(51) Int. Cl.
*G06F 15/00* (2006.01)
*H04N 1/00* (2006.01)

(52) U.S. Cl.
CPC ..... *H04N 1/00973* (2013.01); *H04N 1/00204* (2013.01); *H04N 1/00347* (2013.01); *H04N 1/0048* (2013.01)

(58) Field of Classification Search
None
See application file for complete search history.

(56) References Cited

U.S. PATENT DOCUMENTS

| | | |
|---|---|---|
| 8,823,980 B2 | 9/2014 | Nakagawa |
| 8,953,201 B2 | 2/2015 | Kamiya |
| 8,957,904 B2 | 2/2015 | Kuwano |
| 8,964,230 B2 | 2/2015 | Haba et al. |
| 9,069,502 B2 | 6/2015 | Asahara |
| 9,740,444 B2 | 8/2017 | Hayashi |
| 11,520,547 B2 | 12/2022 | Kaneda |

(Continued)

FOREIGN PATENT DOCUMENTS

| | | |
|---|---|---|
| JP | 2011248764 | 12/2011 |
| JP | 2013132813 | 7/2013 |

(Continued)

OTHER PUBLICATIONS

"Notice of Reasons for Refusal of Japan Counterpart Application", issued on Jun. 17, 2025, with English translation thereof, p. 1-p. 5.

(Continued)

*Primary Examiner* — Mark R Milia
(74) *Attorney, Agent, or Firm* — JCIPRNET

(57) ABSTRACT

An information processing apparatus includes a processor configured to: receive, from a user terminal used by a user who causes the information processing apparatus to execute a process related to a processing request, setting information indicating setting contents of another information processing apparatus known to the user; and prior to executing the process related to the processing request received from the user, execute a setting change process for changing setting contents of the information processing apparatus to the setting contents indicated by the setting information.

13 Claims, 8 Drawing Sheets

(56) References Cited

U.S. PATENT DOCUMENTS

2015/0109638 A1* 4/2015 Sasaki ................ H04N 1/00954
                                                              358/1.15
2019/0265920 A1* 8/2019 Fujii ................... H04L 41/0846

FOREIGN PATENT DOCUMENTS

| JP | 2014178757 | 9/2014 |
| JP | 5704141 | 4/2015 |
| JP | 5893294 | 3/2016 |
| JP | 6025435 | 11/2016 |
| JP | 6261370 | 1/2018 |
| JP | 2018101219 | 6/2018 |
| JP | 6527401 | 6/2019 |
| JP | 2021172073 | 11/2021 |

OTHER PUBLICATIONS

"Notice of Reasons for Refusal of Japan Counterpart Application", issued on Sep. 2, 2025, with English translation thereof, p. 1-p. 6.

* cited by examiner

| CATEGORY | SETTING ITEM | SETTING VALUE |
|---|---|---|
| USB APPLICATION SETTING | ... | ... |
| MOBILE PRINT SETTING | IMAGE QUALITY SETTING | PHOTOGRAPH |
| | GROUND COLOR REMOVAL | VALID |
| | ... | ... |
| INTERFACE SETTING | ... | ... |
| PROTOCOL SETTING | ... | ... |
| SECURITY SETTING | IPSec | VALID |
| | SSL | VALID |
| | TLS | VALID |
| | ... | ... |
| ... | ... | ... |

| JOB TYPE | RELATED CATEGORY |
|---|---|
| PRINTING FROM USER TERMINAL | USB APPLICATION SETTING |
| | MOBILE PRINT SETTING |
| PRINTING DOCUMENT ON SERVER | USB APPLICATION SETTING |
| | MOBILE PRINT SETTING |
| | INTERFACE SETTING |
| | PROTOCOL SETTING |
| | SECURITY SETTING |
| ... | ... |

FIG. 7

| SETTING ITEM | CONVENIENCE STORE | | COWORKING SPACE | | SHARED OFFICE | | PRINTING PLACE | | |
|---|---|---|---|---|---|---|---|---|---|
| | TIGHT | LOOSE | TIGHT | LOOSE | TIGHT | LOOSE | TIGHT | LOOSE | |
| ⋮ | ⋮ | ⋮ | ⋮ | ⋮ | ⋮ | ⋮ | ⋮ | ⋮ | |
| IMAGE QUALITY SETTING | × | ○ | × | ○ | ○ | ○ | ○ | ○ | |
| GROUND COLOR REMOVAL | × | ○ | × | ○ | ○ | ○ | ○ | ○ | |
| ⋮ | ⋮ | ⋮ | ⋮ | ⋮ | ⋮ | ⋮ | ⋮ | ⋮ | |
| IPSec | × | △ | × | △ | × | △ | △ | ○ | |
| SSL | × | △ | × | △ | × | △ | △ | ○ | |
| TLS | × | △ | × | △ | × | △ | △ | ○ | |
| ⋮ | ⋮ | ⋮ | ⋮ | ⋮ | ⋮ | ⋮ | ⋮ | ⋮ | |

| JOB TYPE | RELATED CATEGORY | ALTERNATIVE JOB PROPOSAL |
|---|---|---|
| ... | ... | ... |
| PRINTING DOCUMENT ON SERVER | ... | ... |
| | INTERFACE SETTING | PRINTING FROM USER TERMINAL |
| | ... | ... |
| SENDING OF SCAN DATA VIA EMAIL | ... | ... |
| | INTERFACE SETTING | SENDING URL OF SCAN DATA |
| | ... | ... |
| ... | ... | ... |

| JOB TYPE | ALTERNATIVE INFORMATION PROCESSING APPARATUS |
|---|---|
| ... | ... |
| COLOR COPY | INFORMATION PROCESSING APPARATUS A |
|  | INFORMATION PROCESSING APPARATUS C |
| DOUBLE-SIDED COPY | INFORMATION PROCESSING APPARATUS A |
|  | ... |
| ... | ... |

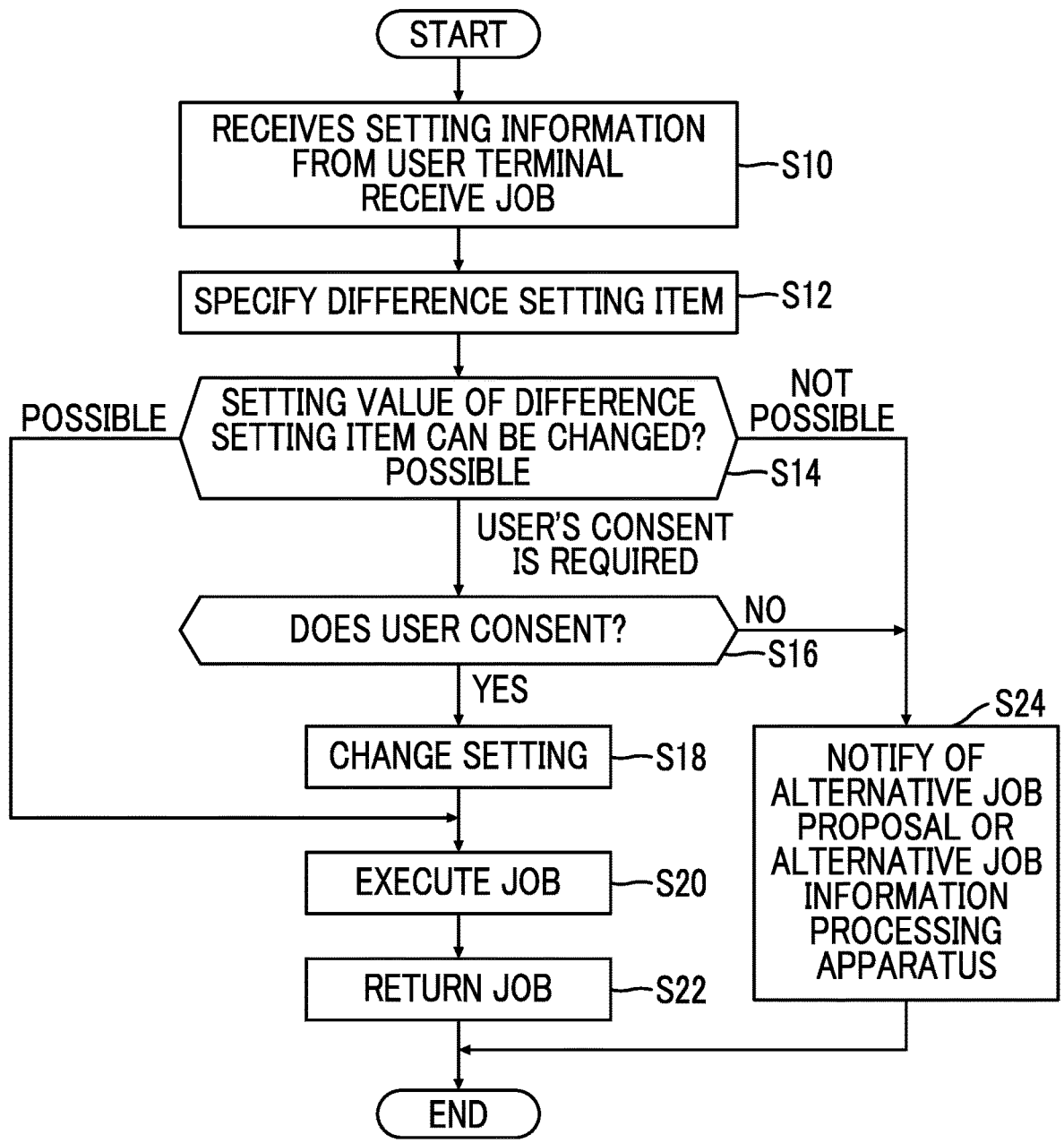

INFORMATION PROCESSING APPARATUS, NON-TRANSITORY COMPUTER READABLE MEDIUM STORING INFORMATION PROCESSING PROGRAM, AND INFORMATION PROCESSING SYSTEM

CROSS-REFERENCE TO RELATED APPLICATIONS

This application is based on and claims priority under 35 USC 119 from Japanese Patent Application No. 2021-188408 filed Nov. 19, 2021.

BACKGROUND

(i) Technical Field

The present invention relates to an information processing apparatus, a non-transitory computer readable medium storing an information processing program, and an information processing system.

(ii) Related Art

In the related art, an information processing apparatus that copies information stored in another information processing apparatus to the information processing apparatus has been proposed. Copying the information stored in the other information processing apparatus to the information processing apparatus is also called importing the information of the other information processing apparatus to the information processing apparatus.

For example, JP5704141B discloses an image forming apparatus that imports import data (for example, user information and destination information) stored in another image forming apparatus into the image forming apparatus, and in a case where a processing request (job) is received, prior to the completion of the import of the import data, first copies information necessary for executing a process related to the job, among the import data. Further, JP6025435B discloses an image forming apparatus that imports import data indicating the setting contents of another image forming apparatus, and as a result of importing the import data, in a case where an import result log cannot be output via an import data reception route, outputs the import result log via a route different from the reception route. Further, JP6261370B discloses an image forming apparatus that imports import data indicating the setting contents of another image forming apparatus, sets an import level for each setting item, and imports a setting value for the setting item corresponding to the import level.

SUMMARY

Incidentally, the user may want to execute a process related to a processing request by an information processing apparatus different from a known information processing apparatus. Although not limited to this, for example, the known information processing apparatus is an information processing apparatus installed in the user's office, and the other information processing apparatus is an information processing apparatus installed in a convenience store or a shared working space. In such a case, it may be desired to change the setting content of the information processing apparatus for which the processing request is to be executed to the setting content of the known information processing apparatus, and then cause the information processing apparatus to execute the process related to the processing request. This is only an example, but for example, in a case where the setting contents of the known information processing apparatus are user-friendly setting contents, the setting contents of the information processing apparatus that executes the processing request may also be changed to the user-friendly setting contents as the known information processing apparatus, and the information processing apparatus may be caused to execute the processing request.

Aspects of non-limiting embodiments of the present disclosure relate to an information processing apparatus, a non-transitory computer readable medium storing an information processing program, and an information processing system in which the user changes the setting contents of the information processing apparatus to the setting contents of known another information processing apparatus, and then causes the information processing apparatus to execute a process related to a processing request.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive, from a user terminal used by a user who causes the information processing apparatus to execute a process related to a processing request, setting information indicating setting contents of another information processing apparatus known to the user; and prior to executing the process related to the processing request received from the user, execute a setting change process for changing setting contents of the information processing apparatus to the setting contents indicated by the setting information.

BRIEF DESCRIPTION OF THE DRAWINGS

Exemplary embodiment(s) of the present invention will be described in detail based on the following figures, wherein:

FIG. 3 is a diagram showing an example of the contents of setting information;

FIG. 6 is a diagram showing an example of the contents of related setting item information;

FIG. 7 is a diagram showing an example of the contents of changeability information;

FIG. 8 is a diagram showing an example of the contents of alternative job information;

FIG. 9 is a diagram showing an example of the contents of alternative apparatus information; and FIG. 10 is a flowchart illustrating a processing flow of a setting duplication destination apparatus.

DETAILED DESCRIPTION

Figure 1:
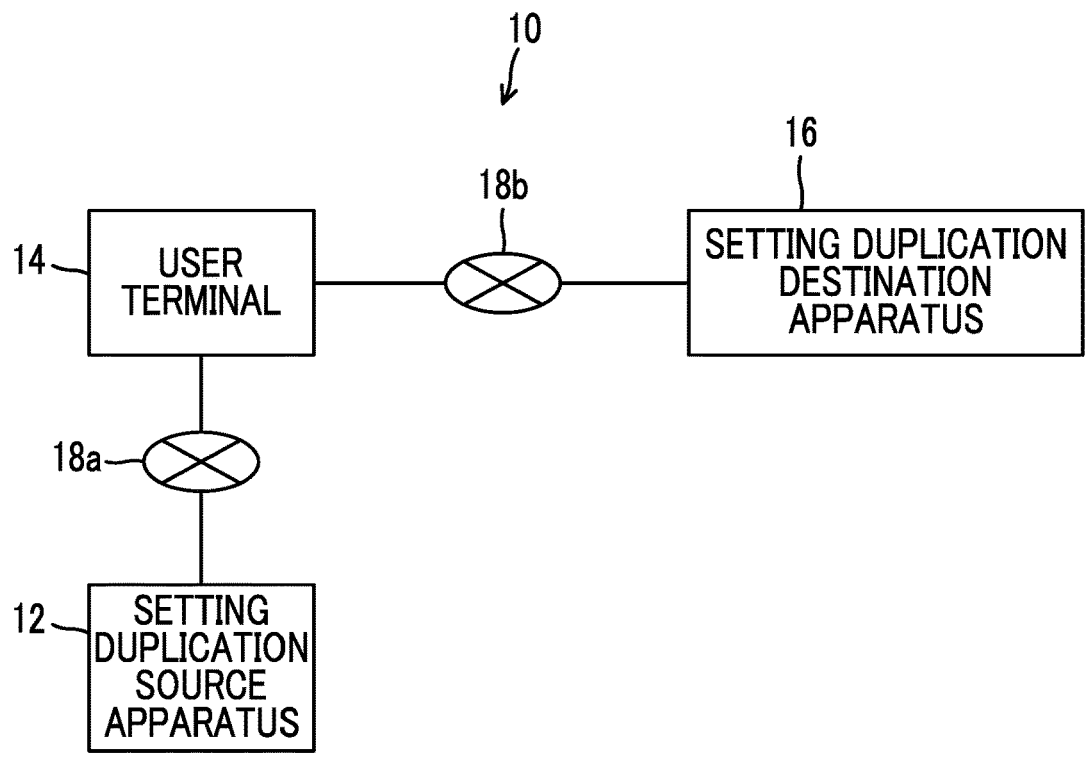
FIG. 1 is a schematic configuration diagram of an information processing system according to the present exemplary embodiment.

FIG. 1 is a schematic configuration diagram of an information processing system 10 according to the present exemplary embodiment. The information processing system 10 includes a setting duplication source apparatus 12 which is an information processing apparatus, a user terminal 14 used by a user, and a setting duplication destination apparatus 16 which is an information processing apparatus. The setting duplication source apparatus 12 and the user terminal 14 can be connected to each other so as to be able to communicate with each other via, for example, a communication line 18*a* such as a wireless local area network (LAN) or short-range wireless communication (for example, Bluetooth (registered trademark)). Further, the user terminal 14 and the setting duplication destination apparatus 16 can be connected to each other so as to be able to communicate with each other via a communication line 18*b* such as a wireless LAN or short-range wireless communication. The setting duplication source apparatus 12 and the setting duplication destination apparatus 16 may not be connected to each other so as to be communicable with each other.

Although details will be described later, in the information processing system 10, setting information indicating the setting contents (details will be described later) of the setting duplication source apparatus 12 is transmitted to the user terminal 14, and the setting information is transmitted from the user terminal 14 to the setting duplication destination apparatus 16, so that the setting contents of the setting duplication source apparatus 12 are duplicated to the setting duplication destination apparatus 16. Then, the user who uses the user terminal 14 (hereinafter, simply referred to as "user") inputs the job as the processing request to the setting duplication destination apparatus 16, and causes the setting duplication destination apparatus 16 to execute the process related to the job. That is, the setting duplication source apparatus 12 corresponds to the "other information processing apparatus" in the description of the claim, and the setting duplication destination apparatus 16 corresponds to the "information processing apparatus" in the description of the claim.

In the present exemplary embodiment, it is assumed that the setting duplication source apparatus 12 and the setting duplication destination apparatus 16 are image processing apparatuses, and the user duplicates the setting contents of the setting duplication source apparatus 12 to the setting duplication destination apparatus 16, and causes the setting duplication destination apparatus 16 to execute the process related to the job. However, the setting duplication source apparatus 12 and the setting duplication destination apparatus 16 are not limited to the image processing apparatuses, and other apparatuses may be used as long as after duplicating the setting contents of the setting duplication source apparatus 12 to the setting duplication destination apparatus 16, the setting duplication destination apparatus 16 can execute the job of the user.

Figure 2:
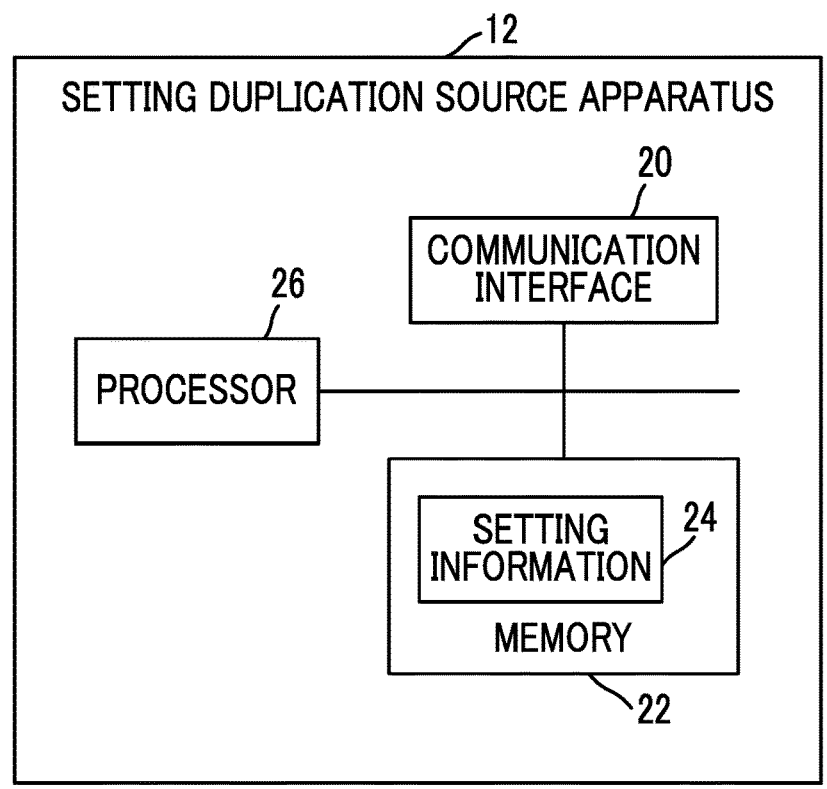
FIG. 2 is a schematic configuration diagram of a setting duplication source apparatus.

FIG. 2 is a schematic configuration diagram of a setting duplication source apparatus 12. The user knows the setting contents of the setting duplication source apparatus 12. It may be said that the setting duplication source apparatus 12 is an apparatus that the user usually uses (in other words, the user uses on a daily basis).

Although not limited to this, for example, the setting duplication source apparatus 12 is an image processing apparatus installed in the office where the user usually works, and the user himself determines the setting content.

The communication interface 20 is composed of, for example, a Network Interface Card (NIC), a Near Field Communication (NFC) adapter, or the like. The communication interface 20 exhibits a function of communicating with the user terminal 14 via LAN or short-range wireless communication.

The memory 22 includes, for example, a Hard Disk Drive (HDD), a Solid State Drive (SSD), an embedded Multi Media Card (eMMC), a Read Only Memory (ROM), a Random Access Memory (RAM), and the like. As shown in FIG. 2, the memory 22 stores the setting information 24.

The setting information 24 is information indicating the current setting contents of the setting duplication source apparatus 12. Here, the setting content indicated by the setting information 24 is for determining the operation content of the setting duplication source apparatus 12, and in particular, is for determining the processing content in a case where the setting duplication source apparatus 12 executes a process related to a job from a user. Further, the setting content is composed of a set of a setting item and a setting value for the setting item. The setting contents may include a plurality of setting values for a plurality of setting items. The setting contents (more specifically, the setting value for each setting item) are determined by the administrator or the user of the setting duplication source apparatus 12, and are stored in the memory 22 as the setting information 24. As described above, the setting values for the setting items include the setting values that can be changed by the user, and the setting information 24 is updated every time the setting value is changed by the user.

FIG. 3 is a diagram showing an example of the setting information 24 of the setting duplication source apparatus 12. For example, the example of FIG. 3 shows that the setting value "photograph" is set for the setting item "image quality setting", and the setting value "valid" is set for the setting item "ground color removal".

Further, as shown in FIG. 3, the setting information 24 shows a setting value for each of a plurality of setting items, and each setting item is classified into one of a plurality of categories. For example, in the example of FIG. 3, the setting items "image quality setting" and "ground color removal" are classified into the same category "mobile print setting", and the setting items "IPSec", "SSL", and "TLS" are classified into the same category "security setting". Although omitted in FIG. 3, other categories (for example, categories "USB application setting", "interface setting", and "protocol setting") also include one or more setting items. A category is a collection of setting items of the same type. For example, the category "mobile print setting" is a collection of setting items that are referred to in a case of executing a print job from a mobile terminal, and the category "security setting" is a collection of setting items related to the security of the setting duplication source apparatus 12. Each category and the setting items included in each category are predetermined by the designer, the administrator, or the like of the setting duplication source apparatus 12.

As described above, the setting value for the setting item can be changed by the user. For example, in a case of inputting a job to the setting duplication source apparatus 12, the user can set setting values for setting items related to execution of the process related to the job. The setting value so set is stored in the memory 22 as the setting information 24. Then, in a case where the setting duplication source apparatus 12 is used next time, the setting value previously set can be used as the setting value of the setting item. Therefore, once the user changes the setting value for each setting item to the setting value suitable for the user, the user does not need to change the setting value one by one, and can continue to use the setting duplication source apparatus 12 with the settings suitable for the user. The setting information 24 may be stored for each user.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. The processor 26 controls each part of the setting duplication source apparatus 12.

In the present exemplary embodiment, since the setting duplication source apparatus 12 is an image processing apparatus, the setting duplication source apparatus 12 includes, for example, a printer unit that performs a printing process, a scanner unit that performs a scanning process, a display that displays various screens, an input interface for inputting user's instructions, or the like, in addition to the above configuration components, but the illustrations are omitted in FIG. 2.

Figure 4:
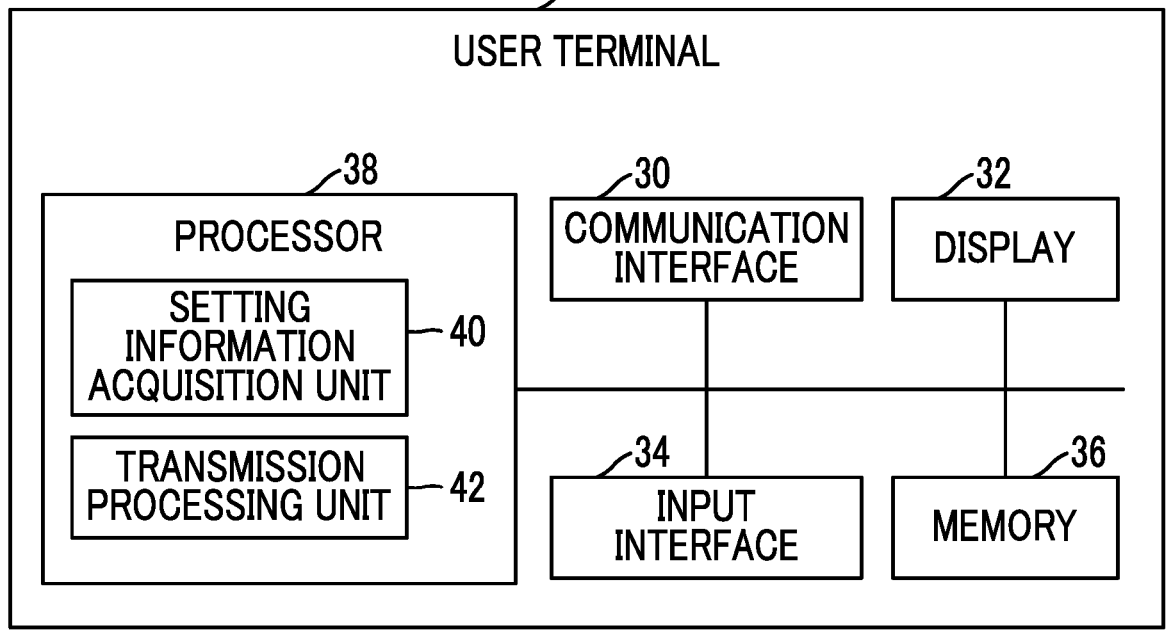
FIG. 4 is a schematic configuration diagram of a user terminal.

FIG. 4 is a schematic configuration diagram of a user terminal 14. In the present exemplary embodiment, the user terminal 14 is a mobile terminal such as a smartphone or a tablet terminal. However, the user terminal 14 is not limited to a mobile terminal as long as a device exhibits the functions described below, and may be, for example, a stationary personal computer.

The communication interface 30 is composed of, for example, a NIC or an NFC adapter. The communication interface 30 exhibits a function of communicating with the setting duplication source apparatus 12 and the setting duplication destination apparatus 16 via LAN or short-range wireless communication.

The display 32 is composed of, for example, a liquid crystal panel or an organic Electro Luminescence (EL). Various screens are displayed on the display 32.

Examples of the input interface 34 include a touch panel, buttons, and the like. The input interface 34 receives an instruction from the user.

The memory 36 includes, for example, an eMMC, a ROM, a RAM, and the like. Various data related to the process of the user terminal 14 are stored in the memory 36. For example, the memory 36 stores the setting information 24 acquired from the setting duplication source apparatus 12.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. The processor 38 controls each part of the user terminal 14. Further, as shown in FIG. 4, the processor 38 exhibits functions as a setting information acquisition unit 40 and a transmission processing unit 42.

The setting information acquisition unit 40 acquires the setting information 24 from the setting duplication source apparatus 12. Specifically, the user connects the setting duplication source apparatus 12 and the user terminal 14 so as to be able to communicate via a LAN or short-range wireless communication, and transmits a transmission request of the setting information 24 from the user terminal 14 to the setting duplication source apparatus 12. In response to the transmission request, the setting duplication source apparatus 12 transmits the setting information 24 stored in the memory 22 to the user terminal 14. The processor 38 of the user terminal 14 stores the received setting information 24 in the memory 36.

The transmission processing unit 42 transmits the setting information 24 acquired from the setting duplication source apparatus 12 to the setting duplication destination apparatus 16. Specifically, the user connects the user terminal 14 and the setting duplication destination apparatus 16 in a communicable manner by LAN or short-range wireless communication, and transmits the setting information 24 to the setting duplication destination apparatus 16. Further, the transmission processing unit 42 can transmit a job (for example, a print job) to the setting duplication destination apparatus 16.

Figure 5:
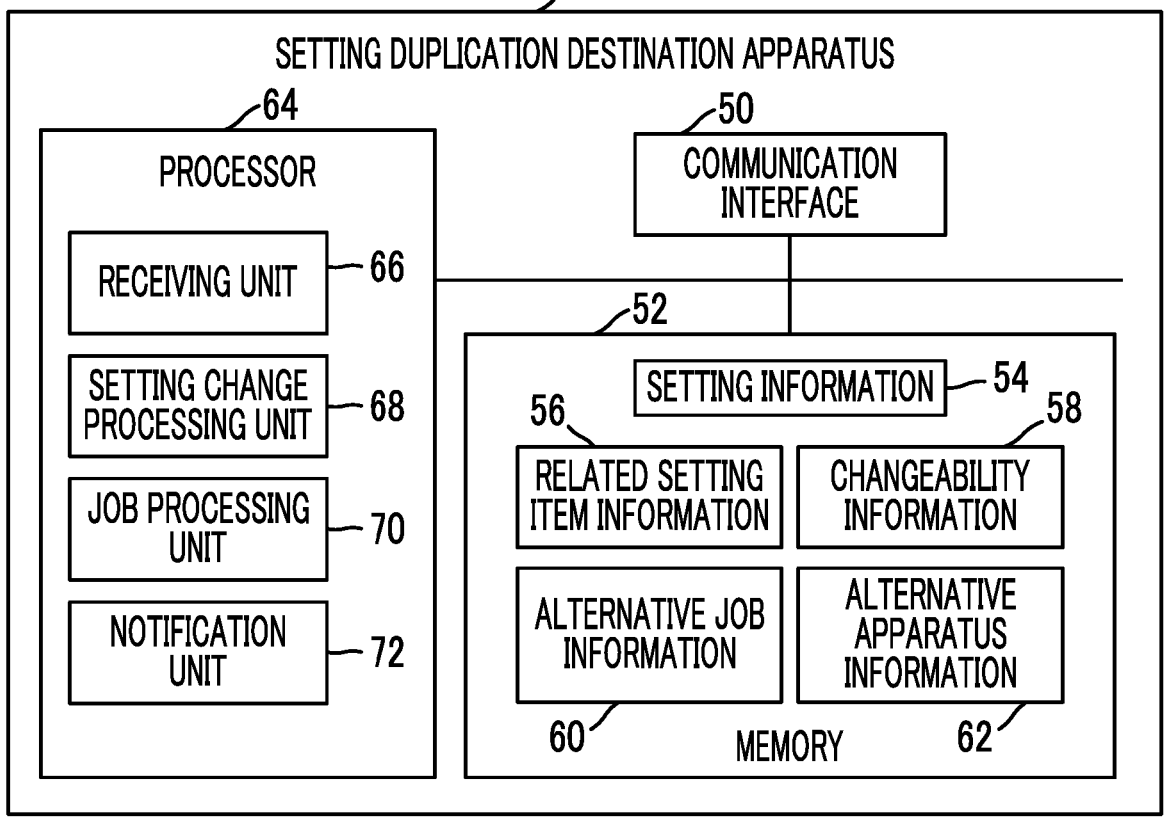
FIG. 5 is a schematic configuration diagram of a setting duplication destination apparatus.

FIG. 5 is a schematic configuration diagram of a setting duplication destination apparatus 16. The user does not know the setting contents of the setting duplication destination apparatus 16. It may be said that the setting duplication destination apparatus 16 is an apparatus that the user does not usually use (in other words, the user does not use on a daily basis). Although not limited to this, for example, the setting duplication destination apparatus 16 is an image processing apparatus installed in a public place or a place that can be used by an unspecified number of users, such as a convenience store, a coworking space, and a shared office. The user may not be familiar with the setting contents for such an image processing apparatus. Further, in a case where the setting contents changed by someone remain in the memory of the image processing apparatus, an unspecified number of users can change the setting contents, so that it becomes difficult to for the user to grasp accurately the setting contents of such an image processing apparatus.

In the present exemplary embodiment, since the setting duplication destination apparatus 16 is also an image processing apparatus, the setting duplication destination apparatus 16 includes, for example, a printer unit that performs a printing process, a scanner unit that performs a scanning process, a display that displays various screens, an input interface for inputting user's instructions, or the like, but the illustrations are omitted in FIG. 5.

The communication interface 50 is composed of, for example, a NIC or an NFC adapter. The communication interface 50 exhibits a function of communicating with the user terminal 14 via LAN or short-range wireless communication.

The memory 52 includes, for example, an HDD, an SSD, an eMMC, a ROM, a RAM, or the like. The memory 52 stores an information processing program for operating each part of the setting duplication destination apparatus 16. The information processing program can also be stored in a computer-readable non-transitory storage medium such as a Universal Serial Bus (USB) memory or a CD-ROM. The setting duplication destination apparatus 16 can read and execute an information processing program from such a storage medium. Further, as shown in FIG. 5, the memory 52 stores setting information 54, related setting item information 56, changeability information 58, alternative job information 60, and alternative apparatus information 62.

The setting information 54 is information indicating the current setting contents of the setting duplication destination apparatus 16. Similar to the setting information 24 of the setting duplication source apparatus 12, the setting content indicated by the setting information 54 is for determining the operation content of the setting duplication destination apparatus 16, and in particular, is for determining the processing content, in a case where the setting duplication destination apparatus 16 executes a process relating to the job received from the user. Similar to the setting information 24, the setting content may be composed of a set of a setting item and a setting value for the setting item, and may include a plurality of setting values for a plurality of setting items. The setting contents (more specifically, the setting value for each setting item) are determined by the administrator or the user of the setting duplication destination apparatus 16, and are stored in the memory 52 as the setting information 54. As described above, the setting values for the setting items include the setting values that can be changed by the user, and the setting information 54 is updated every time the setting value is changed by the user.

The related setting item information 56 is information indicating the relationship between the job type and the setting items related to the process related to the job. In other words, it can be said that the related setting item information 56 is information indicating the setting item referred to by the setting duplication destination apparatus 16 in a case where the process related to the job is executed, with respect to the job type. The related setting item information 56 is prepared in advance by, for example, a designer or an administrator of the setting duplication destination apparatus 16 and stored in the memory 52.

FIG. 6 is a diagram showing an example of the contents of related setting item information 56. In the example of FIG. 6, in the related setting item information 56, the related category is associated with the job type. As described above, since the category is a collection of setting items of the same type, it can be said that the setting items are associated with the job type even in the related setting item information 56 shown in the example of FIG. 6. For example, in the example of FIG. 6, the related categories "USB application setting" and "mobile print setting" are associated with the job type "printing from the user terminal". This indicates that in a case of executing the print job input from the user terminal 14, the setting duplication destination apparatus 16 refers to the setting values of one or a plurality of setting items included in the category "USB application setting" and the setting values of one or a plurality of setting items included in the category "mobile print setting".

The changeability information 58 is information indicating whether or not the setting value can be changed, for each setting item indicated by the setting information 54. The changeability information 58 is also prepared in advance by, for example, a designer or an administrator of the setting duplication destination apparatus 16 and stored in the memory 52.

FIG. 7 is a diagram showing an example of the contents of changeability information 58. In the example of FIG. 7, the changeability information 58 is shown in a table format, and "○", "×", or "Δ" is associated with each setting item. In FIG. 7, "○" indicates that the setting value of the setting item can be changed, and "×" indicates that the setting value of the setting item cannot be changed. The reason why the setting value of the setting item cannot be changed is not limited to these, but for example, it is conceivable that the user is not allowed to change the setting value for the setting item, the change of the setting value for the setting item is not permitted in the operation policy of the setting duplication destination apparatus 16 in the coworking space or shared office, or in a case where the setting value for the setting item is changed, a problem may occur in the proper operation or security of the setting duplication destination apparatus 16. Further, in FIG. 7, "Δ" indicates that the user's consent is required in order to change the setting value of the setting item. For example, in a case where the setting value of the setting item is changed, the process related to the user's job can be executed, but "Δ" is set in a case where there is a possibility that the process result may not be the result desired by the user.

In the present exemplary embodiment, the changeability information 58 indicates whether or not the setting value can be changed for the combination of the setting item and the usage environment of the setting duplication destination apparatus 16. Here, the usage environment includes at least one of the installation location of the setting duplication destination apparatus 16 or the usage conditions. The usage conditions include, for example, whether or not the user who uses the setting duplication destination apparatus 16 is a member of the coworking space or the shared office, or whether the printed matter print by the print job is bound or a pamphlet, in a case where the input job is a print job.

In the example of FIG. 7, "convenience store", "coworking space", "shared office", and "printing place" are shown as installation locations of the setting duplication destination apparatus 16, and as usage conditions for each installation location "loose" and "tight" are specified. For example, in a case where the user who uses the setting duplication destination apparatus 16 is not a member of the installation locations "convenience store", "coworking space", and "shared office", the usage condition becomes "tight", and in a case of the member, the usage condition becomes "loose". Further, for example, at the installation location "printing place", in a case where the printed matter print by the print job is bound, the usage condition is "tight", and in a case where the printed matter is a pamphlet or the like, the usage condition is "loose". As described above, in the example of FIG. 7, the changeability information 58 indicates whether or not the setting value can be changed, for the combination of the setting item, the installation location of the setting duplication destination apparatus 16, and the usage condition of the setting duplication destination apparatus 16.

For example, in the example of FIG. 7, "×" is shown for a combination of the setting item "image quality setting", the installation location "convenience store" of the setting duplication destination apparatus 16, and the usage condition "tight". This indicates that the setting of the setting item "image quality setting" cannot be changed, in a case where the installation location of the setting duplication destination apparatus 16 is a "convenience store" and the user is not a member of the convenience store. On the other hand, "○" is shown for the combination of the setting item "image quality setting", the installation location "convenience store" of the setting duplication destination apparatus 16, and the usage condition "loose". This indicates that the setting of the setting item "image quality setting" can be changed, in a case where the installation location of the setting duplication destination apparatus 16 is a "convenience store" and the user is a member of the convenience store.

The alternative job information 60 is information in which a job type, setting items related to process related to the job, and an alternative job proposal in a case where the setting value for the setting item cannot be changed. The alternative job information 60 is also prepared in advance by, for example, a designer or an administrator of the setting duplication destination apparatus 16 and stored in the memory 52.

FIG. 8 is a diagram showing an example of the contents of alternative job information 60. In the example of FIG. 8, in the alternative job information 60, the related category is associated with the job type and the alternative job proposal. Therefore, in the alternative job information 60, it can be said that the setting item and the alternative job proposal are associated with the job type and the alternative job proposal. For example, in the example of FIG. 8, the related category "interface setting" and the alternative job proposal "printing from the user terminal" are associated with the job type "printing a document on the server". in a case where the user tries to make the setting duplication destination apparatus 16 execute the process related to the server print job for printing the electronic document stored in the document management server or the like, it is assumed that the setting values for the one or a plurality of setting items of included in the related category "interface setting" cannot be changed. In this case, since the setting values cannot be changed, the process related to the server print job cannot be executed, but even in that case, in a case where the print job is transmitted from the user terminal 14, which is an alternative job proposal, the change can be executed properly.

The alternative apparatus information 62 is information in which job type is associated with an alternative information processing apparatus that is an information processing apparatus (image processing apparatus in the present exemplary embodiment) other than the setting duplication destination apparatus 16, capable of executing a process related to the job. The alternative information processing apparatus may be an apparatus installed in the vicinity of the setting duplication destination apparatus 16. The alternative apparatus information 62 is also prepared in advance by, for example, the administrator of the setting duplication destination apparatus 16 and stored in the memory 52.

FIG. 9 is a diagram showing an example of the contents of alternative apparatus information 62. In the example of FIG. 9, for example, the alternative information processing apparatus "information processing apparatus A" and "information processing apparatus C" are associated with the job type "color copy". The "information processing apparatus A" and the "information processing apparatus C" are image processing apparatuses capable of color copying. Therefore, in a case where the setting duplication destination apparatus 16 cannot execute the color copy (in particular, a case where the color copy cannot be executed because the setting values of the setting item to be referred to when executing the color copy cannot be changed), this shows that the alternative information processing apparatus "information processing apparatus A" or "information processing apparatus C" can execute the color copy, instead of the setting duplication destination apparatus 16.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed. The processor 64 controls each part of the setting duplication destination apparatus 16, according to the information processing program stored in the memory 52. Further, as shown in FIG. 5, the processor 64 also exhibits functions as a receiving unit 66, a setting change processing unit 68, a job processing unit 70, and a notification unit 72.

The receiving unit 66 receives the setting information 24 indicating the setting contents of the setting duplication source apparatus 12 acquired from the setting duplication source apparatus 12 by the user terminal 14. Further, the receiving unit 66 can receive a job from the user terminal 14. The receiving unit 66 may receive the setting information 24 and the job together from the user terminal 14, or may receive the setting information 24 and the job separately as long as the correspondence therebetween can be grasped.

The setting duplication destination apparatus 16 can also receive job input directly from the user. For example, a copy job or the like is directly input to the setting duplication destination apparatus 16 by the user operating an input interface (not shown) of the setting duplication destination apparatus 16. However, also in this case, the job is input in such a manner that the correspondence with the setting information 24 received by the receiving unit 66 can be grasped. The correspondence is obtained, for example, by collating the user ID of the user who has transmitted the setting information 24 with the user ID of the user who has directly input the job.

The setting change processing unit 68 executes a setting change process for changing the content of the setting information 54 to the setting content indicated by the setting information 24 corresponding to the job, prior to the execution of the process related to the job. Thus, the setting contents of the setting duplication source apparatus 12 are duplicated as the setting contents of the setting duplication destination apparatus 16. Here, the setting change processing unit 68 may hold the setting contents of the setting duplication destination apparatus 16 before the change, that is, the setting information 54 before the change, in the memory 52.

The job processing unit 70 executes the process related to the job, in the setting contents changed by the setting change processing unit 68.

As described above, according to the present exemplary embodiment, the user changes the setting contents of the setting duplication destination apparatus 16 to the setting contents of the known setting duplication source apparatus 12, and then causes the setting duplication destination apparatus 16 to execute the process related to the job.

After the job processing unit 70 executes the process related to the job in the changed setting contents, the setting change processing unit 68 may return the contents of the changed setting information 54 to the setting information 54 before the change held in the memory 52. That is, the setting change processing unit 68 may return the changed setting contents of the setting duplication destination apparatus 16 to the setting contents before the change.

A case is considered where an unexpected problem may occur, in a case where the setting contents of the setting duplication source apparatus 12 is duplicated as the setting contents of the setting duplication destination apparatus 16, according to the difference in the hardware structure, the installation environment (usage environment), the operation policy, or the like between the setting duplication source apparatus 12 and the setting duplication destination apparatus 16. Therefore, for example, it is desirable to narrow the range for changing the setting contents of the setting duplication destination apparatus 16 (in other words, the range of the setting items for changing the setting value) as much as possible.

Therefore, the setting change processing unit 68 analyzes the received job, specifies the job type, and then, may specify the related setting item that is the setting item related to the process related to the job (that is, the setting item referred to in the process related to the job), among the setting items indicated by the setting information 54, based on the related setting item information 56 (see FIG. 6). For example, in a case where the related setting item information 56 has the content shown in FIG. 6 and the type of the received job is "print from the user terminal", the setting change processing unit 68 refers to the related setting item information 56, and specifies a plurality of setting items included in the categories "USB application setting" and "mobile print setting", as the related setting items of the job. Then, the setting change processing unit 68 may change the setting value of the related setting item, among the setting values for the plurality of setting items included in the received setting information 24, to the value of the setting item indicated by the received setting information 24, and may not change the setting values for setting items other than the related setting items. That is, the setting contents of the setting duplication source apparatus 12 may be duplicated only for the setting items referred to in a case of executing the process related to the received job, and the setting contents of the setting duplication source apparatus 12 may not be duplicated for the other setting items. Thus, the user can execute the process related to the job in the setting duplication destination apparatus 16 with the same setting contents as the setting duplication source apparatus 12, and narrow the range of changing the setting contents of the setting duplication destination apparatus 16 as much as possible.

Further, after specifying the related setting items, the setting change processing unit 68 may refer to the setting information 24 received by the receiving unit 66 and the setting information 54 indicating the current setting contents of the setting duplication destination apparatus 16, and specify a difference setting item which is a setting item in which the setting value in the setting content before the change (that is, the current) of the setting duplication destination apparatus 16 and the setting value indicated by the received setting information 24 are different, among the related setting items. Then, the setting change processing unit 68 may not execute the setting change process, in a case where the setting value for the difference setting item cannot be changed, based on the changeability information 58 (see FIG. 7). Further, as in the present exemplary embodiment, in a case where the changeability information 58 indicates whether or not the setting value can be changed for the combination of the setting item and the usage environment of the setting duplication destination apparatus 16, the setting change processing unit 68 may not execute the setting change process, in a case where the setting value cannot be changed for the combination of the specified difference setting item and the usage environment of the setting duplication destination apparatus 16. In a case where there are a plurality of difference setting items, the setting change process may be executed in a case where the setting values of all the difference setting items can be changed, and the setting change process may not be executed in a case where even one of the setting values can be changed.

For example, a case is considered where the changeability information 58 is the content shown in FIG. 7, and only the "image quality setting" is specified as the difference setting item. In this case, it is assumed that the setting duplication destination apparatus 16 is installed in the coworking space, and the user who input the job to the setting duplication destination apparatus 16 is a member of the coworking space. Here, the information regarding the installation location of the setting duplication destination apparatus 16 is stored in the memory 52 in advance by the administrator of the setting duplication destination apparatus 16 or the like, and the setting change processing unit 68 can acquire the installation location of the setting duplication destination apparatus 16, by referring to the information. Further, the setting change processing unit 68 can determine whether or not the user is a member of the coworking space, based on the login information on the user to the setting duplication destination apparatus 16. In this case, according to the changeability information 58, "○" is indicated for the setting item "image quality setting", the installation location "coworking space", and the usage condition "loose", so that the setting change processing unit 68 executes the setting change process for changing the setting value for the setting item "image quality setting".

On the other hand, it is assumed that the setting duplication destination apparatus 16 is installed in the coworking space, and the user who input the job to the setting duplication destination apparatus 16 is not the member of the coworking space. In this case, according to the changeability information 58, "x" is indicated for the setting item "image quality setting", the installation location "coworking space", and the usage condition "tight", so that the setting change processing unit 68 does not change the setting value for the setting item "image quality setting". That is, the setting change process is not executed.

Further, in a case where the setting change processing unit 68 determines that the user's consent is required to change the setting value for the specified difference setting item, based on the changeability information 58, the setting change processing unit 68 may output to the user, an inquiry for obtaining the user's consent regarding the changeability of the setting value for the difference setting item, and in a case where the user does not consent the inquiry, the setting change processing unit 68 may not execute the setting change process.

For example, a case is considered where the changeability information 58 has the content shown in FIG. 7, and only "IPSec" is specified as the difference setting item. In this case, it is assumed that the setting duplication destination apparatus 16 is installed in the coworking space, and the user who input the job to the setting duplication destination apparatus 16 is a member of the coworking space. In this case, according to the changeability information 58, "Δ" is indicated for the setting item "IPSec", the installation location "coworking space", and the usage condition "loose", so that the setting change processing unit 68 determines that the user's consent is required to change the setting value for the setting item "IPSec".

Therefore, the setting change processing unit 68 outputs an inquiry for obtaining the consent regarding the change of the setting value for the setting item "IPSec", to the user who has transmitted the job to the setting duplication destination apparatus 16. For inquiries, for example, the inquiry screen may be displayed on the display 32 of the user terminal 14, or the inquiry screen may be displayed on the display of the setting duplication destination apparatus 16. Further, on the inquiry screen, the user may be notified of the influence of changing the setting value.

The inquiry screen allows the user to input a response as to whether or not the setting value of the setting item may be changed. For example, on the inquiry screen, a character string such as "is it okay to change the setting value for the setting item "IPSec"?" together with the "Yes" and "No" buttons are displayed. In a case where the user operates the "Yes" button on the inquiry screen, a signal indicating that the change of the setting value for the setting item is consented is input to the setting duplication destination apparatus 16. On the other hand, in a case where the user operates the "No" button, a signal indicating that the change of the setting value for the setting item is not consented is input to the setting duplication destination apparatus 16.

In a case where the user's response to the inquiry is consent, the setting change processing unit 68 executes a setting change process for changing the setting value for the setting item "IPSec". On the other hand, in a case where the user's response to the inquiry is not consented the setting change processing unit 68 does not change the setting value for the setting item "IPSec". That is, the setting change process is not executed.

In a case where the setting change processing unit 68 does not execute the setting change process, the setting duplication destination apparatus 16 may not be able to execute the process related to the job from the user. In view of this, in a case where the setting change processing unit 68 does not execute the setting change process, the notification unit 72 may notify the user of the alternative job proposal associated with the job type received from the user and the difference setting item for which the setting value cannot be changed, based on the alternative job information 60.

For example, it is assumed that the content of the alternative job information 60 is the content shown in FIG. 8, the job type input by the user to the setting duplication destination apparatus 16 is the server print job, and the setting items included in the category "interface setting" are specified by the setting change processing unit 68 as a difference setting item. Here, in a case where the setting change processing unit 68 determines that the setting value for the setting item cannot be changed and does not execute the setting change process, the notification unit 72 refers to the alternative job information 60 and specifies "print from user terminal" associated with the job type "print document in server" and related category "interface setting", as an alternative job. Then, the user is notified of the specified alternative job. As a method of notification, for example, the notification screen may be displayed on the display 32 of the user terminal 14, or the notification screen may be displayed on the display of the setting duplication destination apparatus 16.

By the notification, the user can make the setting duplication destination apparatus 16 execute the process related to the alternative job proposal. In the above example, since the user is notified that the setting duplication destination apparatus 16 cannot executed the server print job and can execute the print job transmitted from the user terminal 14, the user first downloads the electronic document related to the print job to the user terminal 14, transmits the print job for the electronic document from the user terminal 14 to the setting duplication destination apparatus 16, and can cause the setting duplication destination apparatus 16 to execute the process related to the print job.

Further, in a case where the setting change processing unit 68 does not execute the setting change process, the notification unit 72 may notify the user of an alternative information processing apparatus capable of executing the process related to the job received from the user, based on the alternative apparatus information 62.

For example, it is assumed that the content of the alternative apparatus information 62 is the content shown in FIG. 9, and the job type input by the user to the setting duplication destination apparatus 16 is color copy. Here, in a case where the setting change processing unit 68 determines that the setting value cannot be changed for the difference setting item and does not execute the setting change process, the notification unit 72 refers to the alternative apparatus information 62 and specifies the "information processing apparatus A" and the "information processing apparatus B" associated with the job type "color copy", as alternative information processing apparatuses. Then, the user is notified of the specified alternative information processing apparatus. As a notification method, as in the alternative job, for example, the notification screen may be displayed on the display 32 of the user terminal 14, or the notification screen may be displayed on the display of the setting duplication destination apparatus 16.

By the notification, the user can cause the alternative information processing apparatus to execute the process related to the job. In the above-described example, the setting duplication destination apparatus 16 cannot execute the color copy, but the user is notified of the alternative information processing apparatus capable of executing the color copy, so that the user can cause the alternative information processing apparatus to execute the process related to the color copy job by inputting the job to the notified alternative information processing apparatus.

The outline of the configuration of the information processing system 10 according to the present exemplary embodiment is as described above. Hereinafter, the processing flow of the setting duplication destination apparatus 16 will be described with reference to the flowchart illustrated in FIG. 10.

In step S10, the receiving unit 66 receives, from the user terminal 14, the setting information 24 acquired from the setting duplication source apparatus 12 by the user terminal 14. Further, the setting duplication destination apparatus 16 receives a job corresponding to the setting information 24 from the user.

In step S12, the setting change processing unit 68 specifies the job type received in step S10, and specifies the related setting items of the job, based on the related setting item information 56. Then, the setting change processing unit 68 refers to the setting information 24 received in step S10 and the setting information 54 indicating the current setting contents of the setting duplication destination apparatus 16, and specifies a difference setting item from the related setting items. In a case where there is no difference setting item, the setting change processing unit 68 executes the job received by the job processing unit 70 in step S10 without changing the content of the setting information 54, and ends the process.

In step S14, the setting change processing unit 68 determines whether or not the setting value of the difference setting item specified in step S12 can be changed, or whether the user's consent is required to change the setting value of the difference setting item, based on the changeability information 58. In a case where the setting value of the difference setting item can be changed, the process proceeds to step S20 without performing the processes of steps S16 and S18. In a case where the user's consent is required to change the setting value of the difference setting item, the process proceeds to step S16.

In step S16, the setting change processing unit 68 outputs to the user, an inquiry for obtaining the user's consent regarding the changeability of the setting value for the difference setting item for which it is determined in step S14 that the user's consent is required to change the setting value. Then, the setting change processing unit 68 determines whether or not the user consents the inquiry. In a case where the user consents, the process proceeds to step S18.

In step S18, the setting change processing unit 68 holds in the memory 52 the setting contents of the setting duplication destination apparatus 16 before the change, that is, the setting information 54 before the change. Next, the setting change processing unit 68 executes a setting change process for changing the setting value of the related setting item (more specifically, the difference setting item) to the setting value of the setting information 24 acquired from the setting duplication source apparatus 12.

In step S20, the job processing unit 70 executes the process related to the job received in step S10 in the setting contents changed by the setting change processing unit 68 in step S18.

In step S22, the setting change processing unit 68 returns the contents of the setting information 54 changed in step S18 to the setting information 54 before the change held in the memory 52 in step S18, and ends the process.

In a case where the setting value of the difference setting item cannot be changed in step S14, or in a case where the user does not consent in step S16, the process proceeds to step S24.

In step S24, the notification unit 72 notifies the user of the alternative job proposal associated with the job type received from the user in step S10 and the difference setting item for which the setting value cannot be changed, based on the alternative job information 60. Alternatively, the notification unit 72 notifies the user of the alternative information processing apparatus capable of executing the process related to the job received from the user in step S10, based on the alternative apparatus information 62, and ends the process.

Although the exemplary embodiments of the invention have been described above, the present invention is not limited to the above exemplary embodiments, and various modifications can be made without departing from the spirit of the present invention.

For example, in the present exemplary embodiment, the related setting item information 56, the changeability information 58, the alternative job information 60, and the alternative apparatus information 62 are stored in the memory 52 of the setting duplication destination apparatus 16, but these types of information may be stored in another apparatus accessible from the setting duplication destination apparatus 16.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising: a processor configured to:
   receive, from a user terminal used by a user who causes the information processing apparatus to execute a process related to a processing request, setting information indicating setting contents of another information processing apparatus known to the user, wherein
   the processing request includes a job related to printing or scanning, the setting information corresponds to the processing request, and
   original setting contents of the information processing apparatus and the setting contents of the another information processing apparatus include a plurality of setting values for a plurality of setting items,
   execute a setting change process for changing the original setting contents of the information processing apparatus to the setting contents indicated by the setting information,
   execute the process related to the processing request after executing the setting change process,
   wherein the setting change process for changing the original setting contents of the information processing apparatus to the setting contents indicated by the setting information comprising:
   specify a job type out of a plurality of job types for the process related to the processing request,
   refer to a related setting item information which maps the job type to a related setting item out of the plurality of setting items to determine the related setting item corresponding to the job type,
   change a setting value of the related setting item, and
   not change any setting value of the rest of the plurality of setting items.

2. The information processing apparatus according to claim 1, wherein the processor is configured to:
   specify a difference setting item which is a setting item out of the plurality of setting items that has a different setting value between the setting contents of the another information processing apparatus and the original setting contents of the information processing apparatus,
   whether the setting value of the difference setting item is changeable based on a changeability information indicating whether each setting item of the plurality of setting items of the information processing apparatus is changeable, and
   not execute the setting change process in response to the changeability information indicating that the setting value of the difference setting item is not changeable.

3. The information processing apparatus according to claim 2, wherein
   the changeability information indicates whether or not the setting value is able to be changed for a combination of the setting item and a usage environment of the information processing apparatus, and
   the processor is configured to not execute the setting change process, in a case where the setting value for the combination of the difference setting item and the usage environment of the information processing apparatus is not able to be changed.

4. The information processing apparatus according to claim 2, wherein
   the changeability information indicates whether or not the setting value is able to be changed or a user's consent is required to change the setting value for each setting item, and
   the processor is configured to:
   output to the user, an inquiry for obtaining the user's consent regarding changeability of the setting value for the difference setting item, in a case where the user's consent is required to change the setting value for the difference setting item, and not execute the setting change process, in a case where the user does not consent to the inquiry.

5. The information processing apparatus according to claim 2, wherein the processor is configured to:

notify the user of an alternative processing request proposal associated with the type of the processing request received from the user and the difference setting item for which the setting value is not able to be changed, in a case where the setting change process is not executed, based on alternative processing request information in which the type of the processing request, the setting items related to the process related to the processing request, and an alternative processing request proposal in a case where the setting value for the setting item is not able to be changed are associated with each other.

6. The information processing apparatus according to claim 3, wherein the processor is configured to:

notify the user of an alternative processing request proposal associated with the type of the processing request received from the user and the difference setting item for which the setting value is not able to be changed, in a case where the setting change process is not executed, based on alternative processing request information in which the type of the processing request, the setting items related to the process related to the processing request, and an alternative processing request proposal in a case where the setting value for the setting item is not able to be changed are associated with each other.

7. The information processing apparatus according to claim 4, wherein the processor is configured to:

notify the user of an alternative processing request proposal associated with the type of the processing request received from the user and the difference setting item for which the setting value is not able to be changed, in a case where the setting change process is not executed, based on alternative processing request information in which the type of the processing request, the setting items related to the process related to the processing request, and an alternative processing request proposal in a case where the setting value for the setting item is not able to be changed are associated with each other.

8. The information processing apparatus according to claim 2, wherein the processor is configured to:

notify the user of an alternative information processing apparatus capable of executing the process related to the processing request received from the user, in a case where the setting change process is not executed, based on alternative apparatus information in which the type of the processing request and the alternative information processing apparatus capable of executing the process related to the processing request are associated with each other.

9. The information processing apparatus according to claim 3, wherein the processor is configured to:

notify the user of an alternative information processing apparatus capable of executing the process related to the processing request received from the user, in a case where the setting change process is not executed, based on alternative apparatus information in which the type of the processing request and the alternative information processing apparatus capable of executing the process related to the processing request are associated with each other.

10. The information processing apparatus according to claim 4, wherein the processor is configured to:

notify the user of an alternative information processing apparatus capable of executing the process related to the processing request received from the user, in a case where the setting change process is not executed, based on alternative apparatus information in which the type of the processing request and the alternative information processing apparatus capable of executing the process related to the processing request are associated with each other.

11. The information processing apparatus according to claim 1, wherein the processor is configured to:

hold setting contents of the information processing apparatus before change, and change the setting contents of the information processing apparatus, execute the process related to the processing request received from the user, and then return the setting contents of the information processing apparatus to the setting contents before the change.

12. A non-transitory computer-readable medium storing an information processing program causing a computer to execute a process comprising:

receiving, from a user terminal used by a user who causes the information processing apparatus to execute a process related to a processing request, setting information indicating setting contents of another information processing apparatus known to the user, wherein the processing request includes a job related to printing or scanning, the setting information corresponds to the processing request, and original setting contents of the information processing apparatus and the setting contents of the another information processing apparatus include a plurality of setting values for a plurality of setting items;

executing a setting change process for changing the original setting contents of the information processing apparatus to the setting contents indicated by the setting information;

executing the process related to the processing request after executing the setting change process, wherein the setting change process for changing the original setting contents of the information processing apparatus to the setting contents indicated by the setting information comprising:

specifying a job type out of a plurality of job types for the process related to the processing request;

referring to a related setting item information which maps the job type to a related setting item out of the plurality of setting items to determine the related setting item corresponding to the job type;

changing a setting value of the related setting item; and not changing any setting value of the rest of the plurality of setting items.

13. An information processing system comprising:

a user terminal; and an information processing apparatus comprising a processor configured to:

receive, from a user terminal used by a user who causes the information processing apparatus to execute a process related to a processing request, setting information indicating setting contents of another information processing apparatus known to the user, wherein the processing request includes a job related to printing or scanning, the setting information corresponds to the processing request, and original setting contents of the information processing apparatus and the setting contents of the another information processing apparatus include a plurality of setting values for a plurality of setting items, execute a setting change process for changing the original setting contents of the information processing apparatus to the setting contents indicated by the setting information, execute the process related to the processing request after executing the setting change process, wherein the setting change process for changing the original setting contents of the information processing apparatus to the setting contents indicated by the setting information comprising:

specify a job type out of a plurality of job types for the process related to the processing request, refer to a related setting item information which maps the job type to a related setting item out of the plurality of setting items to determine the related setting item corresponding to the job type, change a setting value of the related setting item, and not change any setting value of the rest of the plurality of setting items.

* * * * *